(12) United States Patent
Porter (10) Patent No.: US 8,391,641 B2
(45) Date of Patent: Mar. 5, 2013

(54) METHOD AND APPARATUS FOR FORMING A COMPOSITE IMAGE

(75) Inventor: Robert Mark Stefan Porter, Winchester (GB)

(73) Assignee: Sony Corporation, Tokyo (JP)

( * ) Notice: Subject to any disclaimer, the term of this patent is extended or adjusted under 35 U.S.C. 154(b) by 382 days.

(21) Appl. No.: 12/786,947

(22) Filed: May 25, 2010

(65) Prior Publication Data

US 2011/0052093 A1    Mar. 3, 2011

(30) Foreign Application Priority Data

Aug. 28, 2009 (GB) .................................. 0915114.3

(51) Int. Cl.
    *G06K 9/36*      (2006.01)
(52) U.S. Cl. ....................................................... 382/284
(58) Field of Classification Search ................... 382/284
    See application file for complete search history.

(56) References Cited

U.S. PATENT DOCUMENTS

| | | | |
|---|---|---|---|
| 6,665,003 B1 * | 12/2003 | Peleg et al. ..................... 348/36 |
| 7,313,289 B2 * | 12/2007 | Murata et al. ................. 382/275 |
| 7,373,017 B2 * | 5/2008 | Edwards et al. .............. 382/284 |
| 7,386,188 B2 * | 6/2008 | Peterson ....................... 382/284 |
| 7,864,215 B2 * | 1/2011 | Carlsson et al. ......... 348/211.11 |

FOREIGN PATENT DOCUMENTS

| | | |
|---|---|---|
| JP | 2009-140060 | 6/2009 |
| WO | WO 2005/006776 A1 | 1/2005 |

\* cited by examiner

*Primary Examiner* — Bhavesh Mehta
*Assistant Examiner* — Utpal Shah
(74) *Attorney, Agent, or Firm* — Oblon, Spivak, McClelland, Maier & Neustadt, L.L.P.

(57) ABSTRACT

Disclosed is an apparatus for forming a composite image of a scene from a plurality of overlapping elemental images, the apparatus comprising:

a selector for selecting one point in one of the plurality of images and another point in a second one of the plurality of images, the first point and the other point being overlaid in the composite image and being of substantially the same point in the scene;

a determiner for determining, when the first point and the other point are overlaid, the gradient across the overlap between the first and other elementary image; and an adjuster for adjusting one of the first and second elementary image to minimize the gradient across the overlap. A corresponding method is also disclosed.

11 Claims, 9 Drawing Sheets

METHOD AND APPARATUS FOR FORMING A COMPOSITE IMAGE

BACKGROUND OF THE INVENTION

1. Field of the Invention

The present invention relates to a method and apparatus for forming a composite image.

2. Description of the Prior Art

It is possible to form an image from a number of smaller images. Typically, these smaller images are stitched together to form the larger image. In order to do this, each smaller image must have an area of overlap with adjacent smaller images so that the larger image is continuous. In order to align the smaller images, it is known to select a large number of so-called "correspondence points" in each image. A correspondence point is a point in two adjacent smaller images which represent the same point in the scene. This assists in making the larger image appear continuous.

However, this method has two problems. Firstly, in order to ensure that the smaller images are as closely aligned as possible, a large number of correspondence points are required. Specifically, it is typical that these points are spread over a large area. This means that a large area of overlap is required between adjacent smaller images and so the resolution of the larger image is reduced. Secondly, because the cameras capturing the smaller images can never be exactly co-located, straight lines that traverse the boundaries of the smaller images when stitched to form the larger image are distorted. Typically, this is exhibited as a kink in the line.

It is an aim of the present invention to alleviate these problems.

SUMMARY OF THE PRESENT INVENTION

According to one aspect of the invention, there is provided a method of forming a composite image of a scene from a plurality of overlapping elemental images, the method comprising the steps of:

selecting one point in one of the plurality of images and another point in a second one of the plurality of images, the first point and the other point being overlaid in the composite image and being of substantially the same point in the scene;

whereby, when the first point and the other point are overlaid, determining the gradient across the overlap between the first and second elementary image; and adjusting one of the first and second elementary image to reduce the gradient across the overlap.

This is advantageous because the alignment of the elementary images in the composite image can take place with less overlap. This improves the overall resolution of the composite image.

The method may comprise selecting a second point in the first image and a second point in the second image, the second point in the first image and the second point in the second image also being overlaid in the composite image and being substantially of the same point in the scene.

This improves the alignment of the elementary images in the composite images.

The method may additionally comprise selecting a different point on the first elemental image, the different point being located along a straight line from the point in the scene defined by the first point; and determining the gradient across the boundary in accordance with the gradient of a line connecting the first point and the different point on the first image.

This assists in determining the gradient across the overlap.

In this case, the method may comprise selecting a different point on the second elemental image, the different point being located along a straight line from the point in the scene defined by the first point in the second elemental image; and determining the gradient across the boundary in accordance with the gradient of a line connecting the first point and the different point on the second elemental image Before the gradient across the boundary is determined, the orientation or focal length of the first elemental image or the second elemental image may be adjusted so that the gradient of the line between the first point and the different point in the first or second image is reduced.

The first image may be captured using a first camera element having a first focal length and the second image is captured by a second camera element using a second focal length, whereby the first or second focal length may be adjusted such that the distance between the first point and the other point is reduced when overlaid.

The distance and/or gradient may be minimised. The degree to which the distance and/or gradient is minimised depends on the degree of accuracy required during the alignment process.

The first image or the second elemental image may be adjusted such that the distance between the first point and the other point is reduced when overlaid.

The gradient across the overlap may be determined by using a binary search algorithm.

This reduces the time taken to determine the required parameters.

According to another aspect, there is provided an apparatus for forming a composite image of a scene from a plurality of overlapping elemental images, the apparatus comprising:

a selector for selecting one point in one of the plurality of images and another point in a second one of the plurality of images, the first point and the other point being overlaid in the composite image and being of substantially the same point in the scene;

a determiner for determining, when the first point and the other point are overlaid, the gradient across the overlap between the first and other elementary image; and an adjuster for adjusting the orientation of one of the first and second elementary images to reduce the gradient across the overlap.

The selector may be operable to select a second point in the first image and a second point in the second image, the second point in the first image and the second point in the second image also being overlaid in the composite image and being substantially of the same point in the scene.

The selector may be operable to select a different point on the first elemental image, the different point being located along a straight line from the point in the scene defined by the first point; and the determiner is operable to determine the gradient across the boundary in accordance with the gradient of a line connecting the first point and the different point on the first image.

The selector may be operable to select a different point on the second elemental image, the different point being located along a straight line from the point in the scene defined by the first point in the second elemental image; and the determiner is operable to determine the gradient across the boundary in accordance with the gradient of a line connecting the first point and the different point on the second elemental image Before the gradient across the boundary is determined, the orientation or focal length of the first elemental image or the second elemental image may be adjusted so that the gradient of the line between the first point and the different point in the first image or the second image is reduced.

The first image may be captured using a first camera element having a first focal length and the second image is captured using a second camera element having a second focal length, whereby the first or second focal length is adjusted to reduce the distance between the first point and the other point when overlaid.

The orientation of the first image or the second elemental image may be adjusted such that the distance between the first point and the other point is reduced when overlaid.

The gradient across the overlap may be determined by using a binary search algorithm.

According to another aspect, there is provided a computer program containing computer readable instructions which, when loaded onto a computer configure the computer to perform a method according to embodiments of the invention.

A computer readable storage medium configured to store the computer program therein or thereon is also provided in embodiments.

BRIEF DESCRIPTION OF THE DRAWINGS

The above and other objects features and advantages of the invention will be apparent from the following detailed description of illustrative embodiments which is to be read in connection with the accompanying drawings, in which.

DESCRIPTION OF THE PREFERRED EMBODIMENTS

Figure 1:
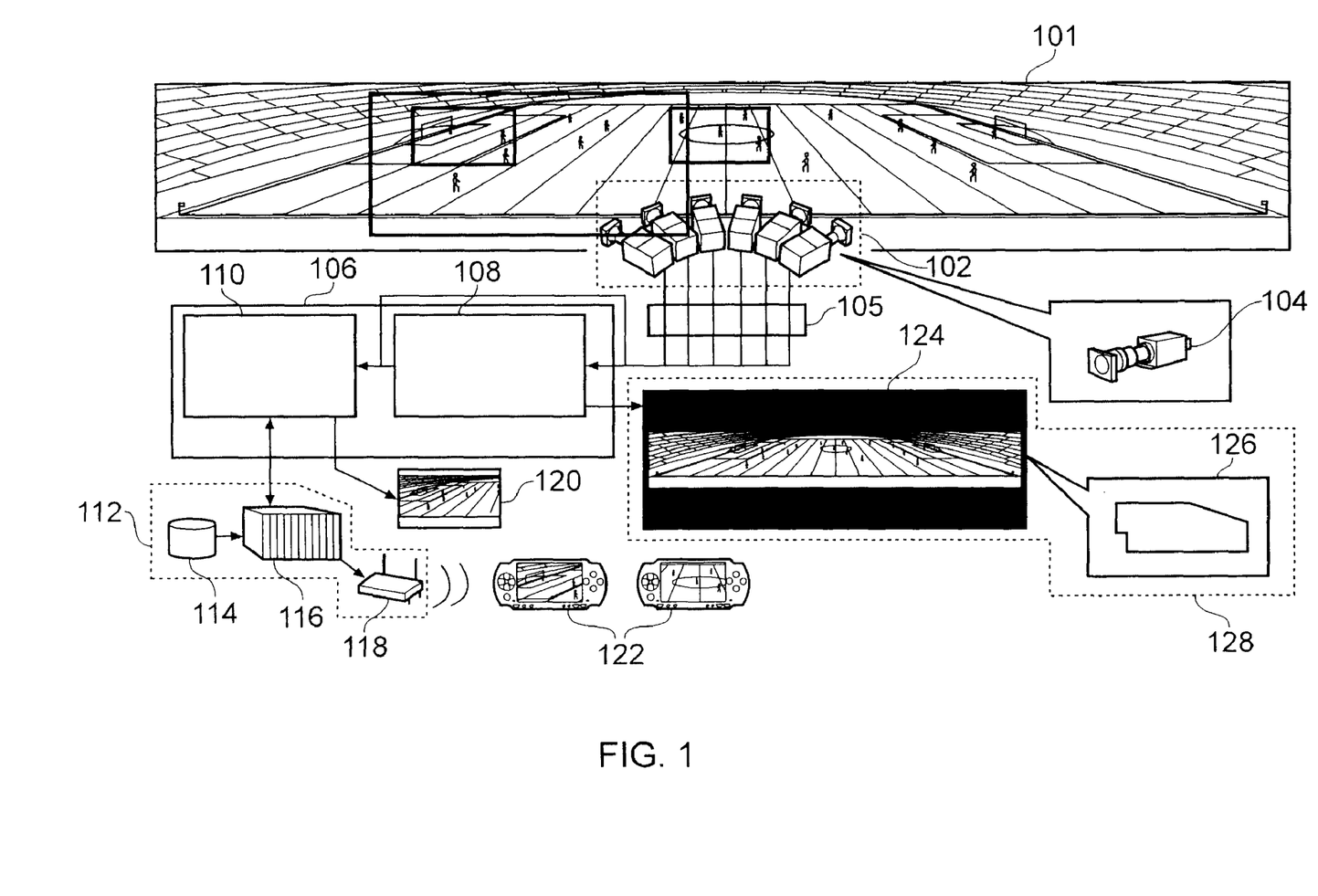
FIG. 1 is a schematic diagram showing a system for capturing elementary images which form a composite image and are aligned according to one embodiment of the present invention.

Referring to FIG. 1, the live event 101, which in this example is a soccer match is held in a venue, which in this example is a stadium.

A camera cluster 102, which in this Figure consists of six individual cameras 104 arranged in a certain configuration (but in FIG. 6 consists of three individual cameras 104), is positioned at an appropriate vantage point in the stadium. The configuration of the camera cluster 102 will be explained in more detail with reference to FIGS. 2A, 2B and 2C. However, in summary, the camera cluster 102 is configured so that the field of view of each camera 104 within the camera cluster 102 overlaps to a small degree with the field of view of an adjacent camera 104 in the camera cluster 102. Thus, the entire live event is covered by panoramic view generated by the totality of the field of view of the camera cluster 102. The vantage point may be at an elevated position in the stadium.

In this embodiment, each camera 104 is a High Definition (HD) camera whose horizontal orientation is transformed by 90° so to produce a portrait image output having a resolution of 1080×1920 rather than 1920×1080 as in the case of a traditional landscape orientation. Additionally, each camera 104 operates in progressive mode rather than interlaced mode. This makes processing of the images generated by the cameras 104 easier. However, the skilled person will appreciate that each camera 104 may, alternatively, operate in interlaced mode. Using a number of these cameras 104 in a camera cluster 102 arranged in the portrait mode allows an output from the camera cluster 102 to have a higher vertical picture resolution. The camera cluster 102 is used to produce a video stream of the soccer match. As the skilled person would appreciate, although the camera cluster 102 is described as being composed of a number of individual cameras 104, the present invention is not so limited. Indeed, the camera cluster need not be made up of a concatenation of complete cameras 104, merely camera elements that each produce an image output. The camera cluster 102 may therefore be a single unit.

In addition to the camera cluster 102, one or more microphones (not shown) may also be provided proximate the camera cluster 102 or disparate to the camera cluster 102 to provide audio coverage of the soccer match.

The output of each camera 104 in the camera cluster 102 is fed to a chromatic aberration corrector 105. In this example, each camera 104 within the camera cluster 102, produces an individual video output and so the camera cluster 102 has, in this case, six outputs. However, in other embodiments only one output of the camera cluster 102 may instead be used which is the multiplexed output of each of the six cameras 104. The output of the chromatic aberration corrector 105 is fed to an image stitching means 108 and a scalable content preparation means 110 which both form part of an image processing device 106 which is an embodiment of the present invention. The image processing device 106 consists of the image stitching means 108 and the scalable content preparation means 110 and in this embodiment, will be realised on a computer. The output of the image stitching means 108 is connected to the scalable content preparation means 110.

The image stitching means 108 takes each high definition image (or elementary image) captured by the respective camera 104 in the camera cluster 102 and combines them so as to produce a panoramic view of the venue. It is important to note that in this embodiment, the output of the image stitching means 108 is not simply the same view as taken using a wide angle lens. The output of image stitching means 108 is a tapestry, or conjoined, version of the output of each individual camera 104 in the camera cluster 102. This means that the output of the image stitching means 108 has a resolution of approximately 8000×2000 pixels rather than a resolution of 1080×1920 pixels as would be the case if one HD camera was fitted with a wide angle lens. The conjoined image (or composite image) is therefore an ultra high resolution image. The advantages of the high definition arrangement are numerous including the ability to highlight particular features of a player without having to optically zoom and therefore affecting the overall image of the stadium. Further, the automatic tracking of an object is facilitated because the background of the event is static and there is a higher screen resolution of the object to be tracked. The image stitching means 108 is described in more detail with reference to FIG. 3.

The output of the image stitching means 108 is fed to either the scalable content preparation means 110 and/or one or more Super High Definition cinemas 128. In this embodiment, the or each super high definition cinema 128 is in a different location to the venue. This allows many spectators who are unable to attend the stadium due to shortage of capacity, or the location of the stadium, to view the live event. Additionally or alternatively, other locations around a stadium may be used to situate the super high definition cinema 128. For example, a bar in the stadium serving refreshments may be used.

The scalable content preparation means 110 is used to generate an image from the ultra high resolution output of the image stitching means 108 so that it may be used by one or more High Definition televisions 120, personal display device 122 having a screen size smaller than a traditional television and/or the super high definition cinemas 124. The scalable content preparation means 110 may generate either a scaled down version of the ultra high resolution image or may generate a segment of the ultra high resolution image using the mapping technique explained hereinafter. In one embodiment, the personal display device 122 is a PlayStation® Portable (PSP®). However, it is envisaged that the personal display device 122 may also be a cell phone, laptop, Personal Digital Assistant or the like or any combination thereof. Additionally, the scalable content preparation means 110 also implements an automatic tracking algorithm to select parts of the ultra-high resolution image to produce video streams for display on the personal display device 122. For example, the scalable content preparation means 110 may automatically track the ball or a particular player or even produce fixed shots of a particular special event, such as scoring a goal in a soccer match or a touch-down in a US Football game.

The output of the scalable content preparation means 110 is fed to a distribution means 112. The distribution means 112 consists of a content database 114 that stores content which may be also distributed, for example replays of special events, or further information relating to a particular player etc. Also within the distribution means 112 is a data streaming means 116 which converts the content to be distributed, either from the scalable content preparation means 110 or from the content database 114 into a format that has an appropriate bandwidth for the network over which the streamed data is to be fed or broadcast. For example, the data streaming means 116 may compress the stream such that it can be fed over an IEEE 802.11b WiFi network or over a cellular telephone network or any appropriate network, such as a Bluetooth network or a Wireless Network. In this embodiment, the network is a WiFi network which is appropriate for the personal display device 122 so the output of the data streaming means 110 is fed to a Wireless Router 118. Although the foregoing describes the data being fed over a WiFi network or a cellular telephone phone network, the invention is not so limited. The data streaming means 116 may compress the stream for broadcast over any network which supports streaming video data such as a $3^{rd}$ or $4^{th}$ generation cellular network, Digital Video Broadcast-Handheld (DVB-H) network, DAB network, T-DMB network, MediaFLO™ network or the like.

The super high definition cinema 124 includes a large screen projector 126 and a screen 124. The output of the image stitching means 108 is fed to the large screen projector 126. In order to provide adequate resolution, the large screen projector 126 may have a display resolution of 8000×2000 pixels or may consist of two conjoined projectors each having a resolution of 4000×2000 pixels. Additionally, the large screen projector 126 may include watermarking technology which embeds a watermark into the displayed image to prevent a user viewing the live event in the super high definition cinema 124 from making an illegal copy of the event using a video camera. Watermarking technology is known and will not be explained in any further detail.

Figure 2A:
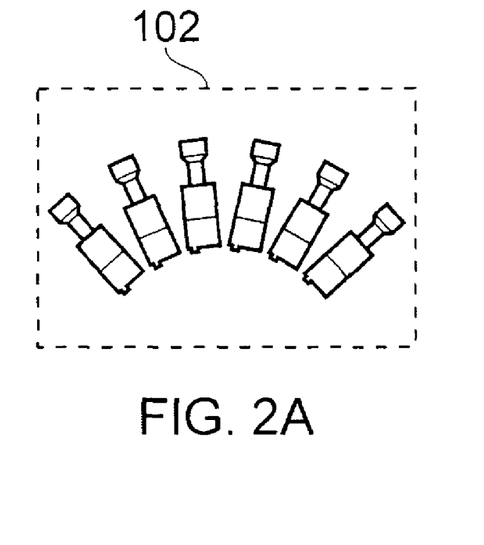
FIGS. 2A and 2B are diagrams showing two alternative camera configurations used in the system of FIG. 1.
Figure 2B:
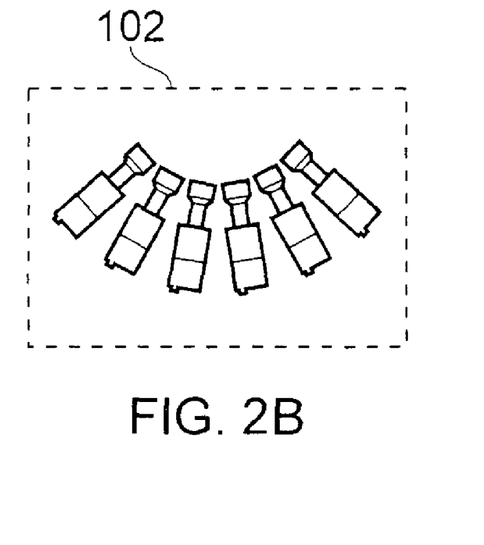

Referring to FIG. 2A, in one embodiment, the lenses of the cameras 104 in the camera cluster 102 are arranged in a horizontally convex manner. In the alternative embodiment in FIG. 2B, the camera lenses of cameras 104 in the camera cluster 102 are arranged in a horizontally concave manner. In either of the two alternative configurations, the cameras 104 in the camera cluster 102 are arranged to produce the minimum parallax effect between adjacent cameras 104 in the camera cluster 102. In other words, the cameras 104 in the camera cluster 102 are arranged such that the focal point of a pair of adjacent cameras are the closest together. The cameras 104 in the arrangement of FIG. 2B have been found to produce a slightly lower parallax error between adjacent cameras 104 than those of FIG. 2A.

Figure 2C:
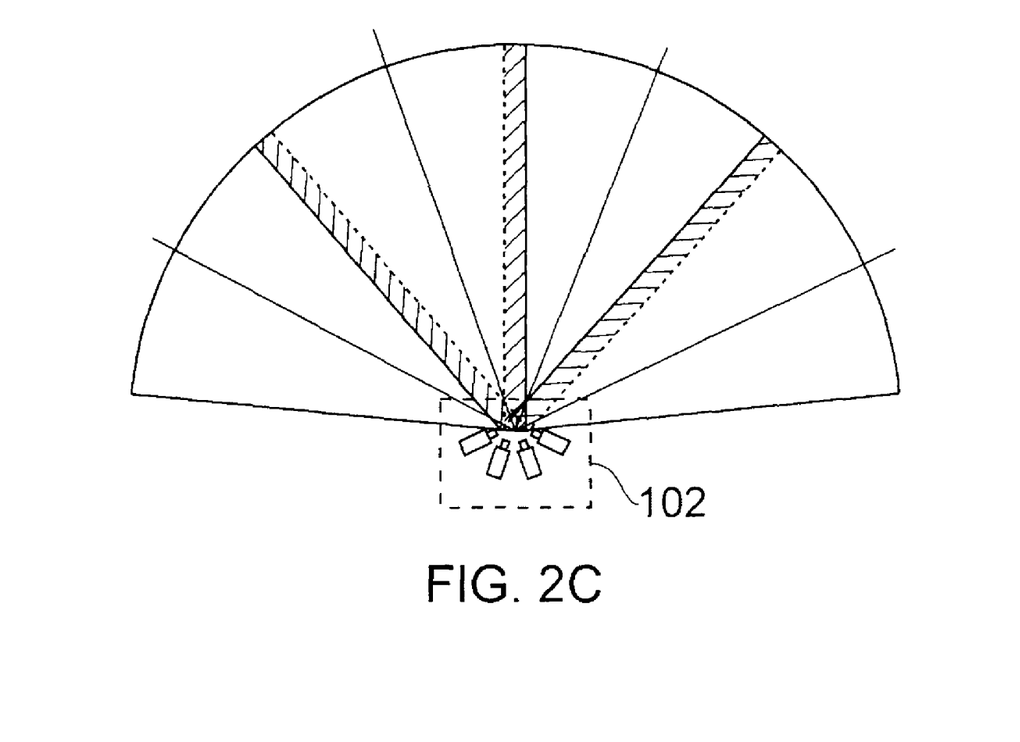
FIG. 2C is a diagram showing the field of vision of the camera cluster shown in FIG. 2B.

In FIG. 2C, the field of view of the camera cluster 102 formed of four cameras arranged in a horizontally concave manner is shown. This is for ease of understanding and the skilled person would appreciate that any number of cameras can be used, including six as is the case with FIG. 1 or three as is the case with FIG. 6. As noted above, in order to ensure that the entire event is captured by the camera cluster 102, in embodiments of the present invention, the field of view of one camera 104 in the camera cluster 102 slightly overlaps the field of view of another camera 104 in the camera cluster 102. This overlap is shown by the hashed area in FIG. 2C. As is explained hereinafter, the effect of the overlap in the conjoined image is reduced in the image stitching means 108. In the camera cluster 102 arranged in the horizontally concave manner, the amount of overlap between the field of view of different, adjacent, cameras 104 is substantially constant regardless of distance from the camera cluster 102. As the amount of overlap is substantially constant, the processing required to reduce the effect of the overlap is reduced. Although the above is described with reference to arranging the cameras in a horizontal manner, the skilled person will appreciate that the cameras may be arranged in a vertical manner.

As described in relation to FIG. 1, the output from the camera cluster 102 is fed into the chromatic aberration corrector 105. The chromatic aberration corrector 105 is known, but will be briefly described for completeness. The chromatic aberration error is corrected for each camera 104. The chromatic aberration manifests itself particularly at the edge of images generated by each camera 104. As already noted, the image output from each camera is 104 is stitched together. Therefore, in embodiments, the chromatic aberration is reduced by the chromatic aberration corrector 105 to improve the output ultra high resolution image.

The chromatic aberration corrector 105 separates the red, green and blue components of the image from each camera 104 for individual processing. The red and green and blue and green components are compared to generate red and blue correction coefficients. Once the red and blue correction coefficients are generated, the red and blue corrected image components are generated in a known manner. The corrected red and blue image components are then combined with the original green image. This forms a corrected output for each camera 104 which is subsequently fed to the image stitching means 108.

The image stitching means 108 then aligns the elementary images according to embodiments of the present invention to improve the appearance of the stitched image and then combines the aberration corrected individual outputs from each camera 104 into the single ultra high definition image. The aligning process is described with reference to FIG. 7 and the combining process is described with reference to FIG. 3.

Figure 3:
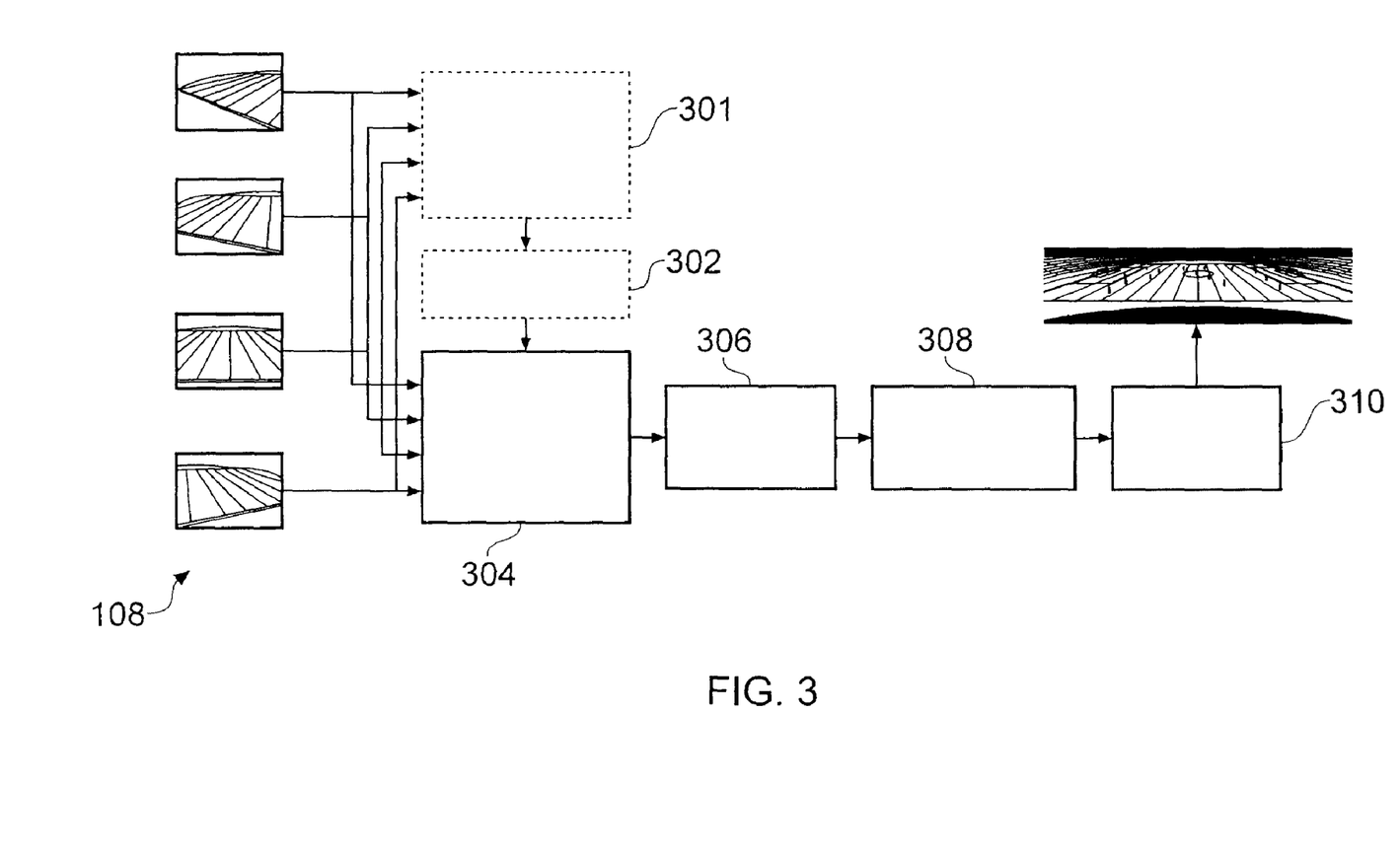
FIG. 3 is a diagram describing the stitching process aligned according to an embodiment of the present invention.

The output from the chromatic aberration corrector 105 is fed into an image alignment means 301 according to embodiments of the invention and a virtual image projection means 304. The output of the image alignment means 301 is fed a camera parameter calculation means 302. The output of the camera parameter calculation means 302 generates camera parameters which minimise the error in the overlap region between two adjacent cameras 104 and improves the overall alignment of the elementary images in the composite image. In this embodiment, the error is the average mean squared error per pixel, although the invention is not so limited. Also, in this embodiment only the roll, pitch, yaw, barrel and focal length of each camera 104 are calculated. As the cameras 104 have similar focal lengths (the values of which are calculated) to reduce the parallax effect noted above and focal points, the relative position between the cameras is not considered. It is envisaged that other parameters are also found, and correction of lens distortion is performed before the alignment process according to embodiments of the present invention takes place. Other errors such as spherical aberration, and the like may also be corrected. Additionally, it is noted that chromatic aberration correction may again be performed after the alignment phase or after generation of the ultra high definition image.

The camera parameters are fed into the virtual image projection means 304. The output of the virtual image projection means 304 is fed into a colour correction means 306. The output of the colour correction means 306 is fed into an exposure correction means 308. The output of the exposure correction means 308 is fed into a parallax error correction means 310. The output of the parallax error correction means 310 is the single ultra high definition image. As noted earlier, it is possible to use an image generated by one camera. In this case, the virtual image projection means 304 would not be required.

Figure 4:
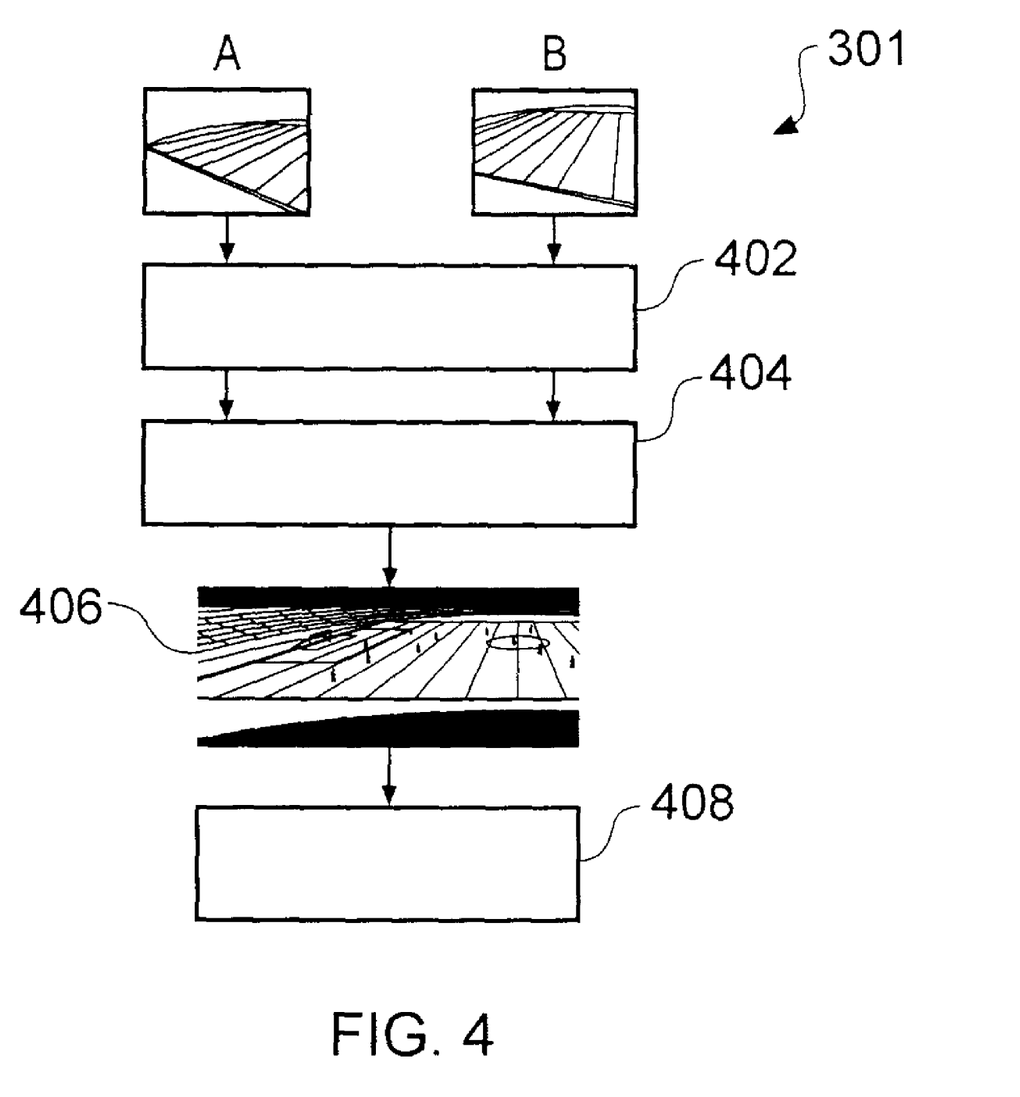
FIG. 4 is a diagram describing the stitching process shown in FIG. 3.

The image alignment means 301 is described with reference to FIG. 4. It is to be noted that the following only describes finding the camera parameters for two adjacent cameras. The skilled person will appreciate that using this method, the camera parameters for any number of cameras can be found.

Live images A and B are generated by two respective adjacent cameras 104 in the camera cluster 102. Before the elementary images can be stitched together, they are aligned according to embodiments of the present invention. This alignment process is discussed with reference to FIGS. 5-9.

After the elementary images have been aligned, in order to minimise the error in the overlap region, a hierarchical search technique is used by the image alignment means 301. Using this method, it is assumed that the camera producing image A is fixed. Both live images are fed into a low pass filter 402. This removes the fine details of the image. By removing the fine detail of the image, the likelihood of the search finding a local minimum is reduced. The amount of filtering applied to each image may be varied during the search. For example, at the start of the search, a greater amount of filtering may be applied compared to at the end of a search. This means that an approximate value of the parameters may be generated and may be refined towards the end of the search allowing a greater amount of detail to be considered and to improve the results.

The low pass filtered images are then fed into the virtual image projection means 304 shown in FIG. 3. The virtual image projection means 304 is used to compensate for the fact that each camera 104 in the camera cluster 102 is facing in a different direction but the ultra high resolution image to be generated should appear to come from one camera pointing in one direction. The virtual image projection means 304 therefore maps one pixel of light received by one camera 104 onto a virtual focal plane. The virtual focal plane corresponds to the focal plane which would have been produced by a virtual camera capable of capturing the panoramic view with ultra high resolution. In other words, the output of the virtual camera would be the stitched ultra high resolution image. The manner in which the virtual image projection means 304 operates is known and is discussed in GB2444533 A and so will not be discussed any further here.

Returning to FIG. 4, after the image has been mapped by the virtual image projection means 304 (resulting in a shot similar to that shown in 406), the mapped image is fed into an exposure corrector 408. The exposure corrector 408 is configured to analyse the exposure and/or colourimetry of the overlap images produced by each camera 104 in the camera cluster 102. With this information, the exposure corrector 408 adjusts the exposure and/or colourimetry parameters of one camera to match those of the other camera. Alternatively, the exposure and/or colourimetry settings of one camera are adjusted such that any sudden changes in exposure and/or colourimetry are removed. However, it is possible that a combination of the above alternatives is utilised. It is advantageous to correct the exposure and/or colourimetry during the alignment process as this results in improved camera parameters. However, it is envisaged that such parameters need not be corrected during the alignment process. If such parameters are not considered during alignment of the cameras, then such correction can be carried out on the images output from the cameras. In this case, it is to be noted that adjusting the image output from one camera to match the exposure and/or colourimetry of the other image may increase the overall dynamic range of the image which would require additional storage and/or processing.

The image output from the exposure corrector 408 is the composite image.

It is noted that although the alignment process has been described with reference to live images, it is possible to use a calibration target which is held in front of the camera. However, using this technique has one distinct disadvantage. For a live event, the calibration target may need to be very large (in excess of 10 meters). Additionally, using live images means that if the camera(s) within the cluster move slightly, for example, due to wind, small adjustments can be made in real-time without affecting the live stream. For example, one of the previously stored minima could be used and the alignment process re-calibrated. Accordingly, the camera parameters may be determined "off-line" i.e. not live on air, or "on-line" i.e. live on air if the re-calibration of cameras is required.

Returning now to FIG. 3, the image stitching means 108 will be further described. After the camera parameters have been established according to embodiments of the present invention, the image output from each camera is fed into a second image projection means 304. The output from the second image projection means 304 is fed into a colour corrector 306. The output from the colour corrector 306 is fed into an exposure corrector 308. It is noted here that the functionality of the second image projection means 304, the colour corrector 306 and the exposure corrector 308 is the same as the image projector 404 and exposure and/or colourimetry corrector 408 described with reference to FIG. 4. This means that the ultra high definition image is subjected to the same corrections as the individual images output from the cameras 104.

The output of the exposure corrector 308 is fed into a parallax error corrector 310. The parallax error corrector 310 prevents "ghosting" which is caused when an object located in the overlap region of two camera images appears twice when the images are stitched together.

In order to address this, in the stitched image, a mask is generated for each of the overlap regions. It is then assumed that any significant errors within the mask are caused by the parallax phenomenon. These errors are quantified using the mean squared average error between pixels in the overlap region. This is a valid assumption as the alignment process minimised any errors due to camera parameters. All individual objects within the masks are labelled using known morphological and object segmentation algorithms. If the significant error between pixels in the overlap region is below a threshold then the two images are blended together. Alternatively, in areas where the error is high, ghosting is deemed to have taken place and only one image from one camera is used. In order to reduce the parallax phenomenon, it is desirable to have the focal points of each camera close together.

Figure 5:
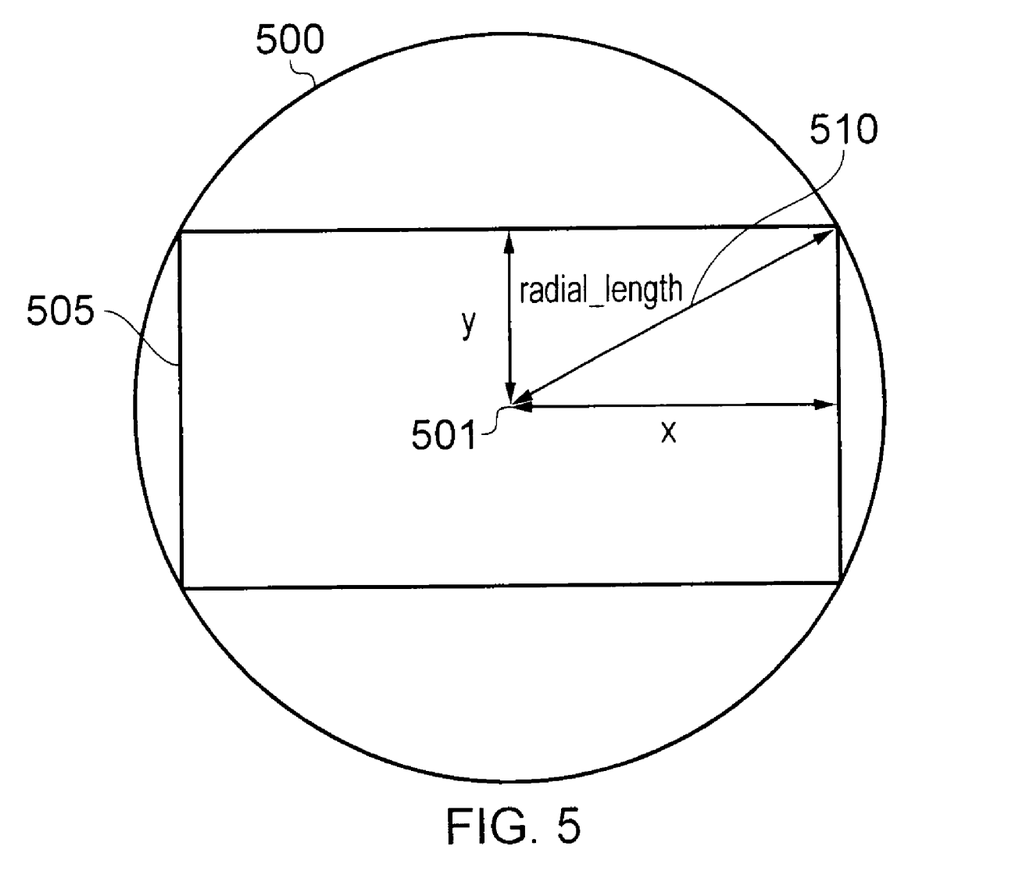
FIG. 5 shows a schematic diagram illustrating the correction for lens distortion.

The alignment process according to embodiments of the present invention will now be described. Referring to FIG. 5, a lens 500 of one of the camera elements 104 is shown. As is understood by the skilled person, a lens 500 has barrel distortion and/or pin-cushion distortion. Collectively, these are referred to as "lens distortion". These distortions are particularly noticeable if the captured image is a large distance from the lens 500 and typically results in straight lines appearing to droop as the line extends away from the optical axis 501 of the lens 500. In other words, as a straight line extends towards the edge of a field of view (in this case a 16:9 image shown by box 505), the straight line will drop as it approaches the edge. In order to improve the quality of the stitched image, and to particularly improve the appearance of straight lines across the image, the lens distortion is corrected before the alignment process of embodiments of the invention takes place.

In order to correct for these distortions, the position of each pixel in the image is converted into an offset from the centre of the image normalised by half the width of the image. In the case of the image being a 16:9 ratio image, the x (or horizontal) value of the offset will be between −1 and +1. In other words, the x-coordinate of the pixel will be an offset from −1 to +1. The y (or vertical) value of the offset will be between −9/16 and +9/16. This is calculated by using the following relationships:

$$x=(\text{image\_col}-\text{image\_width}/2)/(\text{image\_width}/2)$$

$$y=(\text{image\_height}/2-\text{image\_row})/(\text{image\_width}/2)$$

Whereby image_col is the value of the position of the x co-ordinate; image_width is the total image width; and image_row is the value of the position of the y co-ordinate.

The radial length between the centre of the image (the optical axis 501) and each pixel is then calculated. This is calculated using Pythagoras' theorem such that the calculated radial length is normalised to give a value of 1 at the edge of the lens using the equation $$\text{radial\_length}^2=(x^2+y^2)/(1.0^2+0.5625^2)$$

The new position value of each pixel (x',y') is then calculated such that $$x'=x-x^*\text{correction\_factor}^*\text{CCD\_factor}^*(1-\text{radial\_length\_squared})$$

$$y'=y-y^*\text{correction\_factor}^*\text{CCD\_factor}^*(1-\text{radial\_length\_squared})$$

where
correction_factor>0.0 for correcting barrel distortion; correction_factor<0.0 for correcting pin cushion distortion; and correction_factor=0.0 for no lens distortion correction.

The term CCD_factor is a constant which is dependent upon the CCD size of the camera element 104. In one embodiment, the value of CCD_factor in 1.702 and correction_factor is −0.022 which corrects for typical amounts of pin cushion distortion on a wide angle lens.

In embodiments, the user of the system manually identifies the distortion on the image and applies a correction. Typically, this is done by identifying a straight line in the scene (for instance, a line on the soccer pitch) and choosing a value for correction_factor that makes the line appear straight on the image. This may be done manually, or by clicking on the line in the image and dragging the line so that it corresponds with the straight line on the pitch. It is possible to perform this lens distortion correction for each camera element 104 in the camera array. Alternatively, it is possible to assume that the lenses in each camera element 104 within the array are well matched and to apply the correction_factor to each camera element 104.

After lens distortion has been corrected, the alignment of the elementary images captured by the camera elements 104 according to embodiments of the present invention takes place so that these images may be stitched together to form the composite image.

Figure 6:
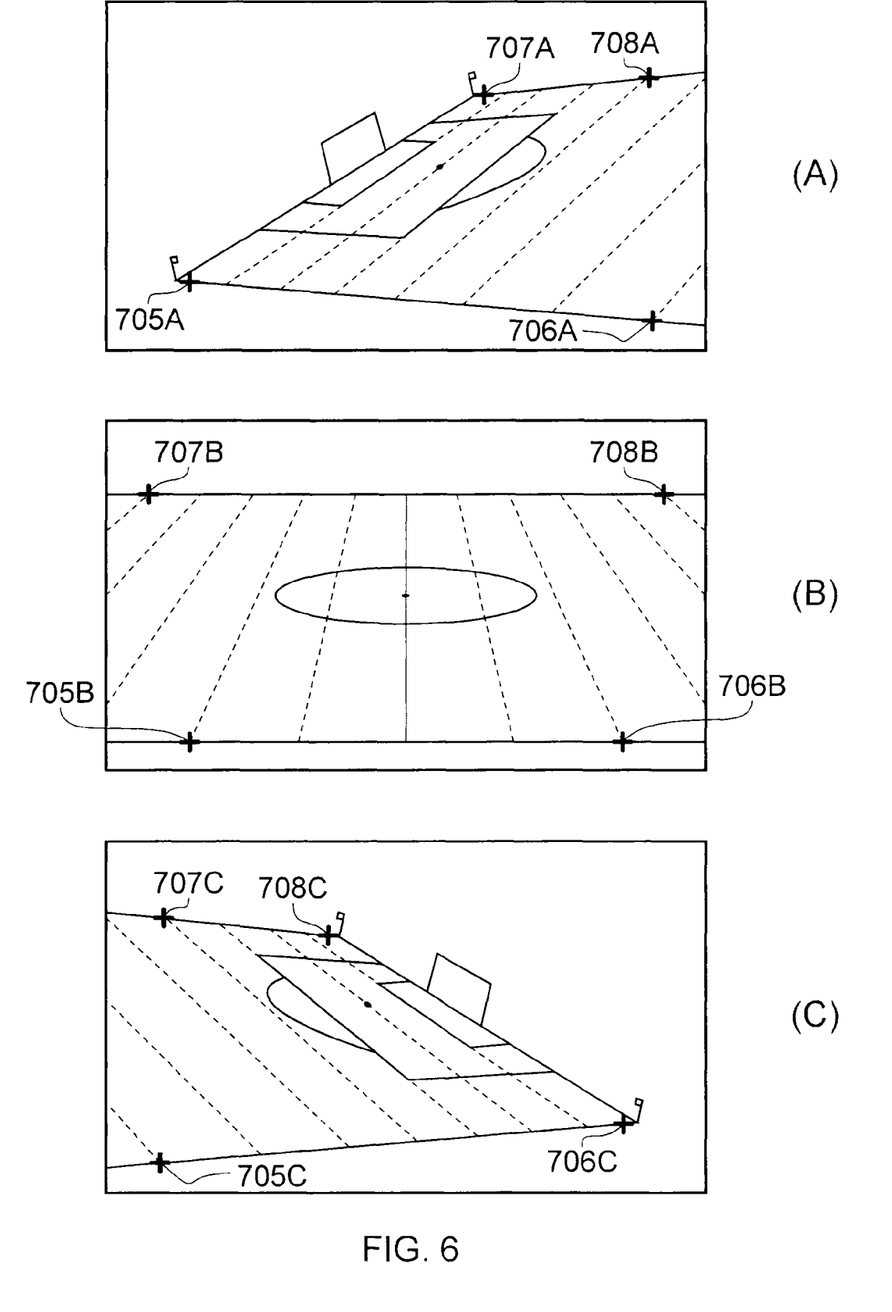
FIG. 6 shows a schematic diagram of outputs from three cameras which are used in the system of FIG. 1 to capture the composite images.

Firstly, the user of the system of FIG. 1 selects the central camera feed (i.e. camera feed B in FIG. 6). The user then selects four image points on the image (705B, 706B, 707B and 708B). It is noted here that the four points are located towards the edge of the image. These points are called "corresponding points" and will be explained later.

The user then selects a second of the camera feeds. In this case, the user selects the camera element pointing to the left hand side of the pitch (i.e. camera A in FIG. 6). The user then selects four image points on the image (705A, 706A, 707A, 708A). It should be noted here that image point 706A and 708A are also "corresponding points". A "corresponding point" means a point in the image that refers to a specific point in the scene. In other words, image point 706A and 705B refer to the same point in the scene and similarly image point 707B and 708A also refer to the same point in the scene. Consequently, point 705B and 707B and 706A and 708A are in an area of overlap between the image feed from camera A and B and image point 705B will overlap with image point 706A and image point 707B will overlap with image point 708A.

Image points 705A and 707A are located near the respective corner flags of the soccer pitch. This is because, as will be explained later, in embodiments image point 705A is located on the same straight line in the scene as image point 706A and image point 707A is located on the same straight line in the scene as image point 708A. As will be explained later, in embodiments of the invention, the gradient of the straight lines within the scene will be measured. Therefore, by separating image point 708A and 707A and 706A and 705A as far as possible, the resolution of any gradient measure will be increased and will thus increase the accuracy of the gradient measure.

The user then selects a third of the camera feeds. In this case, the user selects the camera element pointing to the right hand side of the pitch (i.e. camera C in FIG. 6). The user then selects four other image points on the image (705C, 706C, 707C, 708C). It should be noted that 705C and 707C are also "corresponding points" and specifically overlap with image points 706B and 708B respectively.

Image points 708C and 706C are located near the respective corner flags of the soccer pitch. This is because, as will be explained later, in embodiments image point 708C is located on the same straight line in the scene as image point 707C and image point 706C is located on the same straight line in the scene as image point 705C. Similarly, as the gradient of the straight lines will be measured, image points 707C and 708C should be separated as far as possible and image points 705C and 706C should be separated as far as possible to increase the resolution of any gradient measure and thus accuracy of the gradient measure. The selection of the image points is step S800 in FIG. 7.

Figure 7:
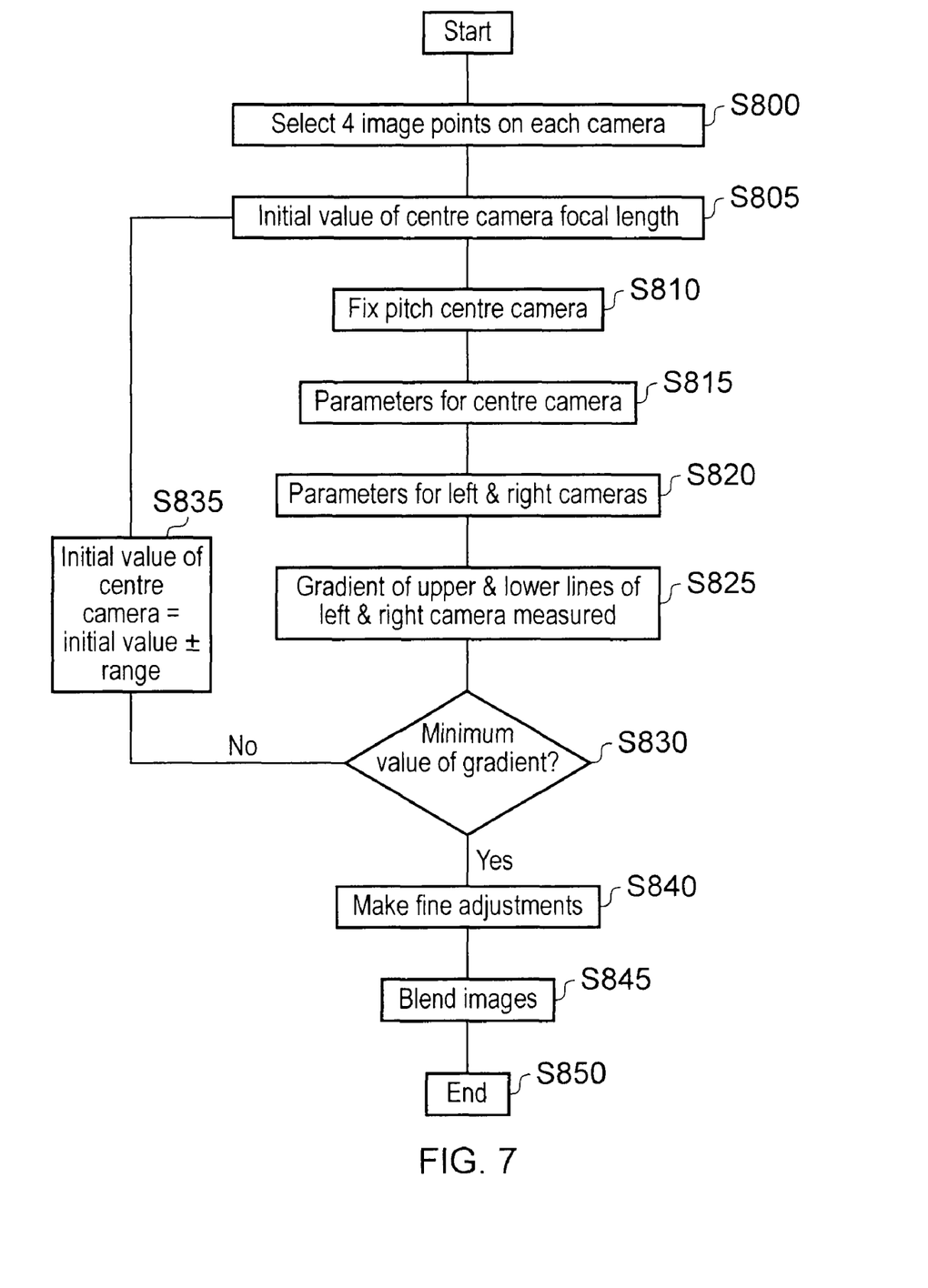
FIG. 7 shows a flow diagram explaining the alignment process according to embodiments of the present invention.

After the image points have been selected, a focal length for camera feed B or in other words, the central camera element 104 is selected (Step S805 of FIG. 7). This is effectively the amount of zoom that is applied at the camera element 104. By knowing the actual focal length of the camera element 104, it is possible to manipulate the image provided by camera feed B to replicate different focal lengths of the camera element 104. In other words, knowing the focal length of camera element 104 providing camera feed B, it is possible to electronically replicate different focal lengths without constantly changing the actual focal length of camera element 104.

During the alignment process of embodiments of the present invention, the image points that have been selected by the user will be transformed to replicate the effect of adjusting the camera parameters. This transformation process will now be described.

As the skilled person will appreciate, a camera can be moved in three ways; pitch (or upward and downward vertical inclination of the camera), yaw (or sideward motion about the vertical axis); and roll (or rotation around the optical axis of the camera). These effects are replicated on the image points selected by the user by the transformation process described below.

Firstly, the image points are converted into an offset from the optical axis, normalised by half the width of the image. This is performed in a similar manner to that described in relation to the correction of lens distortion. In embodiments, the image points are then corrected for lens distortion as explained above, although this correction is not essential.

The pitch of the centre camera is fixed to zero (step S810 of FIG. 7). The calibration of the centre camera then begins (step S815 of FIG. 7). This is discussed in relation to FIG. 8.

Figure 8:
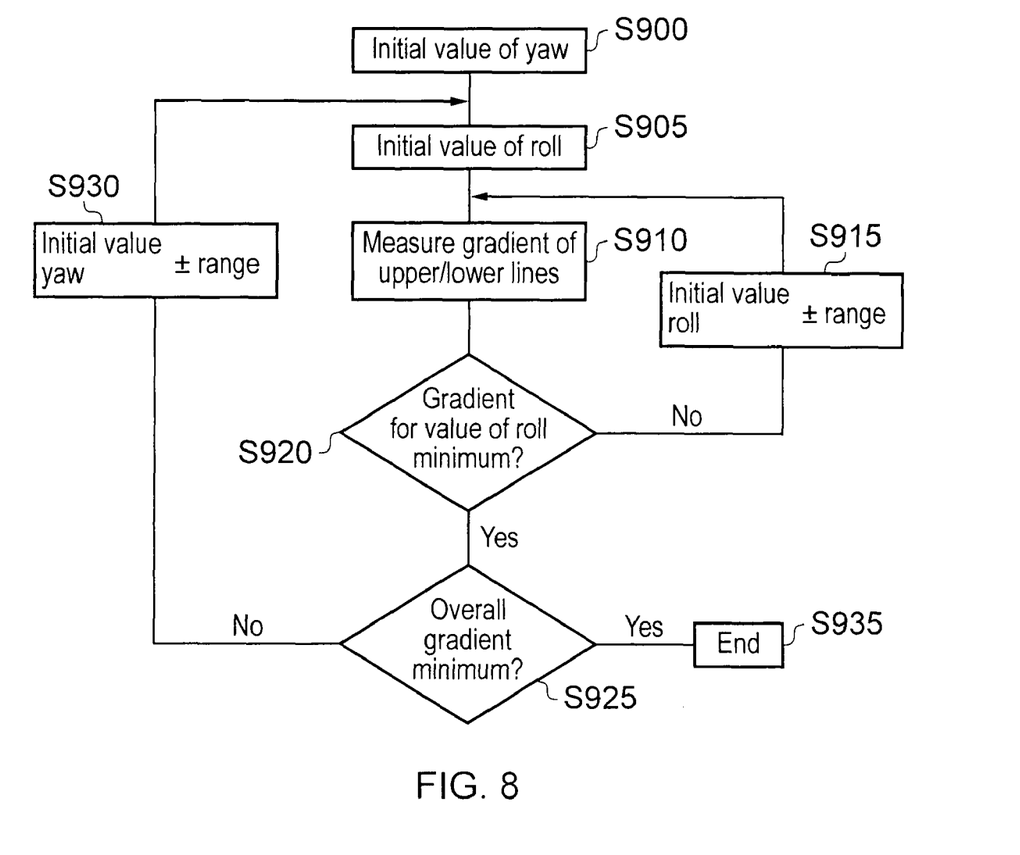
FIG. 8 shows a flow diagram explaining the calibration of the centre of the three cameras of FIG. 6.

In step S900, an initial value of yaw is provided. This may be +5°, although any value can be used. In step S905, an initial value of roll is selected. This can be any value for example −5°.

In order to calculate the gradient of the line connecting image points 705B and 706B and between lines 707B and 708B, so that such gradient can be minimised, it is necessary to apply a rotational transform to each of the image points to replicate the adjustment process.

The transformation process for the image points is applied as a three-dimensional matrix of the form $$\text{RotationMatrix} = \text{rotation(yaw)} * \text{rotation(pitch)} * \text{rotation(roll)}$$

This has the effect of applying a roll rotation, followed by a pitch rotation and finally a yaw rotation.

In particular, each matrix is of the form $$\text{Rotation(yaw)} = \begin{bmatrix} \cos(\alpha) & 0 & -\sin(\alpha) \\ 0 & 1 & 0 \\ \sin(\alpha) & 0 & \cos(\alpha) \end{bmatrix}$$

$$\text{Rotation(pitch)} = \begin{bmatrix} 1 & 0 & 0 \\ 0 & \cos(\beta) & -\sin(\beta) \\ 0 & \sin(\beta) & \cos(\beta) \end{bmatrix}$$

$$\text{Rotation(roll)} = \begin{bmatrix} \cos(\gamma) & -\sin(\gamma) & 0 \\ \sin(\gamma) & \cos(\gamma) & 0 \\ 0 & 0 & 1 \end{bmatrix}$$

Where $\alpha$, $\beta$ and $\gamma$ are angles of yaw, pitch and roll respectively.

The input vector which represents the image points selected by the user is of the form $$V = \begin{bmatrix} x' \\ y' \\ \text{focal\_length} \end{bmatrix}$$

Where x' is the image co-ordinate in the x-direction corrected for lens distortion; y' is the image co-ordinate in the y-direction corrected for lens distortion and focal-length represents the focal length applied to the lens.

The transformation is then performed such that $$V' = \text{RotationMatrix} * V$$

In order for the transformed image points to be normalised for depth (as the points are projected onto the same z-plane i.e. displayed on a screen), the co-ordinates have to be divided by the z-co-ordinate (i.e. the co-ordinate looking into the image along the optical axis).

Therefore, the x and y co-ordinates of the user selected image points (x" and y") are given by $$x'' = V'(1)/V'(3)$$

$$y'' = V'(2)/V'(3)$$

As noted above, the gradient between the transformed image points is calculated. The gradient is measured by dividing the difference in the y" co-ordinates by the difference in the x" co-ordinates. In other words, to calculate the gradient between lines 705B and 706B, the following equation is used $$\text{Gradient}_{705B\text{to}706B} = (y''_{705B} - y''_{706B})/(x''_{705B} - x''_{706B})$$

A similar calculation is performed to calculate the gradient between lines 707B and 708B.

As the gradient for both lines should be minimised, and the transform affects both lines, the sum of the absolute values of the gradients is calculated. In other words, $$\text{Gradient\_sum} = \text{abs}(\text{gradient}_{705B\text{to}706B}) + \text{abs}(\text{gradient}_{707B\text{to}708B})$$

is calculated.

As noted above, as the pitch is fixed at zero, the yaw, and roll should be established for the parameters of the central camera element 104 which minimises the Gradient_sum. In order to achieve this, the yaw is adjusted by an increment such as 0.5°. For each value of yaw, the roll value across a range of values (say initially 20° increments) is adjusted and the Gradient_sum for each adjusted roll value is calculated by applying the transform and calculating the Gradient_sum described above.

In order to determine the most suitable yaw and roll values, a binary search technique is used. This technique is described in FIG. 8 and is particularly suitable because the intention of the optimal value is to quickly minimise a metric (the Gradient_sum in this case). In order to perform the binary search, an initial value of yaw is chosen (step S900 in FIG. 8) (for example)+0.2° and for this initial value of yaw, an initial roll value (say)+0.4° is chosen Step S905.

The gradient of the lines is measured for these values Step S910. In other words, the equation for Gradient_sum is solved.

As the gradient will not be a minimum at this stage Step S920, new roll values will be used. The next roll values will be above and below this initial roll value (keeping the yaw value the same). For example, with the yaw value the same, the next roll value will be +20.4° (i.e. initial_value+range) and the subsequent roll value will be −19.6° (i.e. initial_value−range). This is shown in step S915.

The value of Gradient_Sum is solved for each of the roll values. The roll value giving the lowest value of Gradient_sum will be used as the next initial_value. The process is then repeated. However, in order to converge on a minimum value quickly, the value of range is halved for each subsequent iteration. This binary search algorithm will terminate for this particular value of yaw when the range reaches a certain threshold value, and thus the gradient for the roll value is deemed a minimum value.

After a roll value giving the minimum value of Gradient_sum is calculated (the "yes" path at step S920), the next iteration of yaw value is selected. The yaw value is also found using a binary search technique.

The next values of yaw will be above and below this initial value of yaw in a similar manner to that described above in respect of roll values. In other words, the next value of yaw will be determined by (initial_value$_{yaw}$+range$_{yaw}$) and (initial_value$_{yaw}$−range$_{yaw}$) step S930. For each one of these values of yaw, the value of roll giving the lowest Gradient_sum value is determined using the binary search technique.

After the minimum value of Gradient_sum for each value of yaw is calculated, the value of yaw providing the minimum value of Gradient_sum will be selected as the new initial_value$_{yaw}$ and the range will be halved to provide convergence to the value of yaw providing the lowest value of Gradient_sum.

The binary search algorithm to find the value of yaw is stopped when the value of the range$_{yaw}$ is below a certain threshold value (step S935). After the binary search algorithm to find the value of yaw is performed, the yaw value and the roll value giving the lowest value of Gradient_sum is determined. In other words, the value of yaw and roll is established which provides the lowest gradient for the horizontal lines on the pitch.

After the camera parameters for the centre camera element 104 have been established, the left camera feed (i.e. camera feed A) is selected.

In order to properly align the image from camera feed A with the image from camera feed B, the image points 706A and 708A need to be aligned with image points 705B and 707B respectively. For this, the parameters of camera feed A need to be found (step S820 of FIG. 7).

In order to achieve this, a set of nested binary search algorithms are used which determine the minimum distance between the respective image points. In order to calculate this value, the minimum horizontal distance and vertical distance between the corresponding image points needs to be calculated.

The horizontal positions of image points 708A and 706A are compared with the horizontal positions of image points 707B and 705B. The yaw value that minimises this horizontal distance is selected to be the appropriate yaw value. In other words, a binary search algorithm is used which minimises the equation $$\text{Horizontal\_distance\_sum} = (x_{706A} - x_{705B})^2 + (x_{708A} - x_{707B})^2$$

Additionally, in order to calculate the minimum vertical distance between image points 708A and 707B and image points 706A and 705B, the pitch value providing the minimum value for the following equation needs to be found $$\text{Vertical\_distance\_sum} = (y_{706A} - y_{705B})^2 + (y_{708A} - y_{707B})^2$$

In order to find the minimum overall distance between the image points, the sum of the horizontal_distance_sum and the vertical_distance_sum is calculated. In other words, the equation $$\text{combined\_distance\_sum} = \text{horizontal\_distance\_sum} + \text{vertical\_distance\_sum}$$

should be minimised to determine the optimal focal length for camera feed A.

Additionally, to improve the continuity of the upper and lower pitch lines, the gradient of the upper and lower pitch lines need to be minimised. In other words, the roll of the camera needs to be established that minimises the gradient of a line between 705A and 706A and 707A and 708A respectively. To achieve this, the equation $$\text{Gradient\_sum}_{left} = \text{abs}(\text{gradient}_{705A\,to\,706A}) + \text{abs}(\text{gradient}_{707A\,to\,708A})$$

needs to be minimised.

Figure 9:
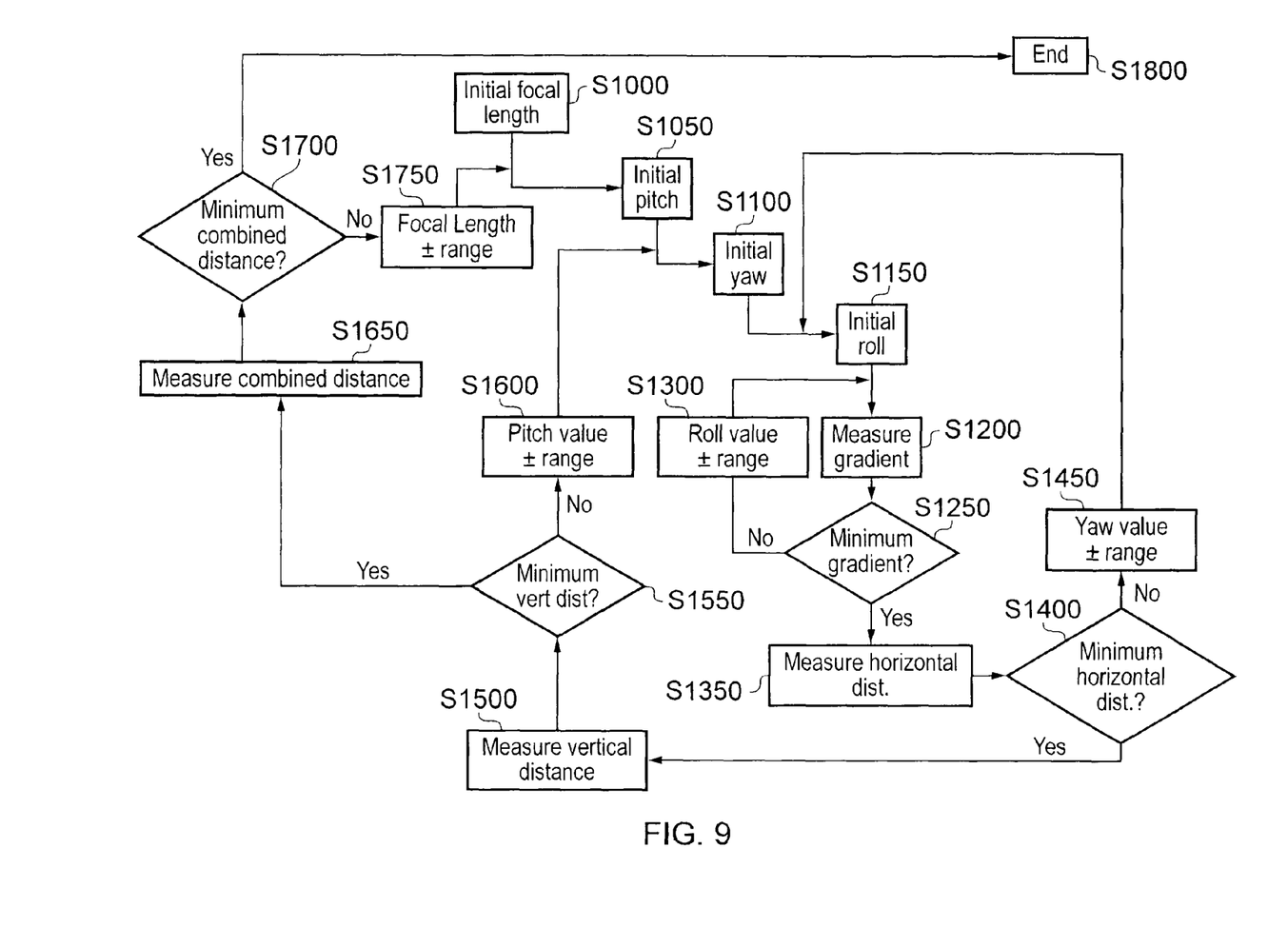
FIG. 9 shows a flow diagram explaining the calibration of the left and right of the three cameras in FIG. 6.

So, turning to FIG. 9, a starting value for the focal length of the camera providing camera feed A is chosen (step S1000). Due to the proximity of the camera element providing camera feed A to the camera element providing camera feed B, the same focal length as that provided on the central camera is chosen as an initial value for focal length.

For this focal length, the pitch value of the camera element 104 providing feed A is adjusted. As in the binary search algorithm mentioned above, an initial value for the pitch is chosen (step S1050). For this initial value of the pitch, an initial value of yaw is selected (step S1100). For this initial value of the yaw, an initial value of the roll is selected (step S1150). The value of Gradient_sum$_{left}$ is calculated for the initial value of roll (step S1200).

The value of the roll is then varied in a manner similar to the binary search algorithm explained hereinbefore. In other words, the next value of the roll is set above and below the initial value by a range (step S1300). The value of the Gradient_sum$_{left}$ is calculated for the next values of roll (step S1200). The value of roll giving the lowest Gradient_sum$_{left}$ value is chosen as the next initial value of roll. The range is halved and the binary search is continued until a minimum value of Gradient_sum$_{left}$ is established (step S1250). This is deemed to have occurred when the range falls below a certain threshold value (such as 0.05 degrees).

The value of horizontal_distance_sum is then measured using the initial value of yaw (step S1350). The value of the yaw is then varied in a manner similar to the binary search algorithm explained hereinbefore. In other words, the next value of the yaw is set above and below the initial value by a range (step S1450). The value of the horizontal_distance_sum is calculated for the next value of yaw. However, for each value of yaw, the value of roll giving the lowest value of Gradient_sum$_{left}$ is calculated. In other words, the binary search algorithm used to calculate the Gradient_sum$_{left}$ is nested in the binary search algorithm used to calculate every value of the horizontal_distance_sum. The value of yaw giving the lowest horizontal_distance_sum value is chosen as the next initial value of yaw. The range is halved and the binary search is continued until a minimum value of horizontal_distance_sum is established (step S1400). This is deemed to have occurred when the range falls below a certain threshold value (such as 0.05 degrees).

The value of vertical_distance_sum is then measured using the initial value of pitch (step S1500). The value of the pitch is then varied in a manner similar to the binary search algorithm explained hereinbefore. In other words, the next value of the pitch is set above and below the initial value by a range (step S1600). The value of the vertical_distance_sum is calculated for the next value of pitch. However, for each value of pitch, the value of yaw giving the lowest value of horizontal_distance_sum is calculated. In other words, the binary search algorithm used to calculate the horizontal_distance_sum is nested in the binary search algorithm used to calculate every value of the vertical_distance_sum. The value of pitch giving the lowest vertical_distance_sum value is chosen as the next initial value of pitch. The range is halved and the binary search is continued until a minimum value of vertical_distance_sum is established (step S1550). This is deemed to have occurred when the range falls below a certain threshold value (such as 0.05 degrees).

The value of combined_distance_sum is then measured using the initial value of focal length (step S1650). The value of the focal length is then varied in a manner similar to the binary search algorithm explained hereinbefore. In other words, the next value of the focal length is set above and below the initial value by a range (step S1750). The value of the combined_distance_sum is calculated for the next value of focal length. However, for each value of focal length, the value of pitch giving the lowest value of vertical_distance_sum is calculated. In other words, the binary search algorithm used to calculate the vertical_distance_sum is nested in the binary search algorithm used to calculate every value of the combined_distance_sum. The value of focal length giving the lowest combined_distance_sum value is chosen as the next initial value of focal length. The range is halved and the binary search is continued until a minimum value of combined_distance_sum is established (step S1700). This is deemed to have occurred when the range falls below a certain threshold value (such as 0.01 millimeters).

After the parameters for focal length, pitch, yaw and roll for the camera element 104 giving camera feed A are found a similar procedure takes place for camera feed C (step S820 in FIG. 7).

The result of these nested algorithms is that the minimum distance between corresponding image points for a given focal length of the centre camera 104 is established. It should be noted here that the distance between the points can be changed by altering the pitch, yaw and roll as described. Additionally, the distance between the points can be altered by altering the focal length of one or more cameras. This may be done instead of, or in combination with the changing of the pitch, roll and yaw of the cameras. This also applies to determining the gradient of the line overlapping the boundary between each elementary image.

In order to provide a stitched image having an improved alignment, the gradient of the upper and lower lines of feed A and C needs to be minimised (step S825 in FIG. 7).

To do this, the value of the focal length is varied to minimise the gradient of the line between image points 707A and 708C and the gradient of the line between image points 705A and 706C. In other words, a binary search is carried out which establishes the focal length of the centre camera element 104 that minimises the equation $$\text{Overall\_gradient\_sum} = \text{Gradient\_sum}_{left} + \text{gradient\_sum}_{right}$$

By minimising the overall gradient between the most extreme image points which are located along a straight line in the scene, the stitched image looks more realistic.

In the binary search, the next value of the focal length of the centre camera 104 is then varied in a manner similar to the binary search algorithm explained hereinbefore. In other words, the next value of the focal length is set above and below the initial value by a range (step S835). The value of the overall_gradient_sum is calculated for the next value of focal length. However, for each value of focal length, the parameters of yaw and roll of the centre camera is found as well as the values of focal length, pitch, roll and yaw for each of the left and right hand camera feeds. In other words, the binary search algorithm used to calculate all the camera parameters is nested in the binary search algorithm used to calculate every value of the overall_gradient_sum. The value of focal length of the centre camera giving the lowest overall_gradient_sum value is chosen as the next initial value of focal length. The range is halved and the binary search is continued until a minimum value of overall_gradient_sum is established (step S830 in FIG. 7). This is deemed to have occurred when the range falls below a certain threshold value (such as 0.001 millimeters).

Optionally, the user manually adjusts some of the calculated parameters to achieve the most accurately stitched image (step S840). The manual adjustments have a much finer range of change than those used in the binary search algorithm. For example, the range of change of the manual adjustment may be $\frac{1}{10}^{th}$ the value of the minimum range used as a threshold in the binary search algorithm.

In order to further improve the stitched image, a luminance correction is applied. This corrects for differences in exposure. Multiplication factors are applied to the luminance values in order to better match the exposures of adjacent camera elements 104. These can be performed manually, or automatically. If automatically performed, the luminance multiplication factors are found which make the average pixel values in the overlap region on each camera element the same.

Finally, Alpha blending is applied to the edges of the overlapping regions (step S845). A start point and percentage of image is defined for the left and right hand side of each camera element.

In embodiments of the invention, where there are three camera feeds, the central camera image is displayed over the left and right hand camera images. This means that blending only needs to be applied to the left and right hand edges of the centre image.

After the edges have been blended, the composite image is formed.

It is envisaged that embodiments of the present invention may be performed on a computer and/or microprocessor. In this case, the invention may be embodied as a computer program that contains computer readable instructions that configure the computer and/or microprocessor to perform a method embodying the invention. It is envisaged that such a program may be stored on a computer readable medium such as an optical disk, hard drive or even signals transmitted over the Internet or any type of network. In this case, the invention may be embodied in such a form.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined in the appended claims.

I claim:

1. A method of forming a composite image of a scene from a plurality of overlapping elemental images, the method comprising the steps of:
    selecting a first point in a first elemental image of the plurality of elemental images and a second point in a second elemental image of the plurality of elemental images, the first point and the second point being overlaid in the composite image and being of substantially a same point in the scene;
    determining, when the first point and the second point are overlaid, a gradient across an overlap between the first and the second elemental images;
    adjusting one of the first and the second elemental images to reduce the gradient across the overlap;
    selecting a first different point on the first elemental image, the first different point being located along a straight line from a point in the scene defined by the first point;
    determining a gradient across a boundary between the first and the second elemental images in accordance with a gradient of a line connecting the first point and the first different point on the first image;
    selecting a second different point on the second elemental image, the second different point being located along a straight line from a point in the scene defined by the second point in the second elemental image; and
    determining the gradient across the boundary between the first and the second elemental images in accordance with a gradient of a line connecting the second point and the second different point on the second elemental image and wherein, before the gradient across the boundary is determined, one of an orientation and focal length of the first elemental image or the second elemental image is adjusted so that the gradient of the line between the first point and the first different point in the first elemental image or the gradient of the line between the second point and the second different point in the second elemental image is reduced.

2. A method according to claim 1, further comprising selecting a third point in the first image and a fourth point in the second image, the third point in the first image and the fourth point in the second image also being overlaid in the composite image and being substantially of a same point in the scene.

3. A method according to claim 1, wherein the first image is captured using a first camera element having a first focal length and the second image is captured by a second camera element using a second focal length, wherein the first focal length or the second focal length is adjusted such that a distance between the first point and the second point is reduced when overlaid.

4. A method according to claim 1, wherein the orientation of the first image or the second elemental image is adjusted such that a distance between the first point and the second point is reduced when overlaid.

5. A method according to claim 1 wherein the gradient across the overlap is determined by using a binary search algorithm.

6. An apparatus for forming a composite image of a scene from a plurality of overlapping elemental images, the apparatus comprising:
    a selector operable to select a first point in a first elemental image of the plurality of elemental images and a second point in a second elemental image of the plurality of elemental images, the first point and the second point being overlaid in the composite image and being of substantially a same point in the scene;
    a determiner operable to determine, when the first point and the second point are overlaid, a gradient across an overlap between the first and the second elemental images; and
    an adjuster operable to adjust one of the first and the second elemental images to reduce the gradient across the overlap, wherein the selector is operable to select a first different point on the first elemental image, the first different point being located along a straight line from a point in the scene defined by the first point, and the determiner is operable to determine a gradient across a boundary between the first and the second elemental images in accordance with a gradient of a line connecting the first point and the first different point on the first image, wherein the selector is operable to select a second different point on the second elemental image, the second different point being located along a straight line from a point in the scene defined by the second point in the second elemental image, and the determiner is operable to determine the gradient across the boundary between the first and the second elemental images in accordance with a gradient of a line connecting the second point and the second different point on the second elemental image and before the gradient across the boundary is determined, one of an orientation and focal length of the first elemental image or the second elemental image is adjusted so that the gradient of the line between the first point and the first different point in the first elemental image or the gradient of the line between the second point and the second different point in the second elemental image is reduced.

7. An apparatus according to claim 6, wherein the selector is operable to select a third point in the first image and a fourth point in the second image, the third point in the first image and the fourth point in the second image also being overlaid in the composite image and being substantially of a same point in the scene.

8. An apparatus according to claim 6, wherein the first image is captured using a first camera element having a first focal length and the second image is captured using a second camera element having a second focal length, wherein the first focal length or the second focal length is adjusted to reduce a distance between the first point and the second point when overlaid.

9. An apparatus according to claim 6, wherein the orientation of the first elemental image or the second elemental image is adjusted such that a distance between the first point and the second point is reduced when overlaid.

10. An apparatus according to claim 6 wherein the gradient across the overlap is determined by using a binary search algorithm.

11. A non-transitory computer readable medium having stored thereon a program that when executed by a computer causes the computer to execute a method of forming a composite image of a scene from a plurality of overlapping elemental images, the method comprising the steps of:

selecting a first point in a first elemental image of the plurality of elemental images and a second point in a second elemental image of the plurality of elemental images, the first point and the second point being overlaid in the composite image and being of substantially a same point in the scene;

determining, when the first point and the second point are overlaid, a gradient across an overlap between the first and the second elemental images;

adjusting one of the first and the second elemental images to reduce the gradient across the overlap;

selecting a first different point on the first elemental image, the first different point being located along a straight line from a point in the scene defined by the first point;

determining a gradient across a boundary between the first and the second elemental images in accordance with a gradient of a line connecting the first point and the first different point on the first image;

selecting a second different point on the second elemental image, the second different point being located along a straight line from a point in the scene defined by the second point in the second elemental image; and determining the gradient across the boundary between the first and the second elemental images in accordance with a gradient of a line connecting the second point and the second different point on the second elemental image and wherein, before the gradient across the boundary is determined, one of an orientation and focal length of the first elemental image or the second elemental image is adjusted so that the gradient of the line between the first point and the first different point in the first elemental image or the gradient of the line between the second point and the second different point in the second elemental image is reduced.

* * * * *